INVENTOR.
JOHN W. TIERNEY
ATTORNEY.

United States Patent Office 2,813,126
Patented Nov. 12, 1957

2,813,126

PROCESS FOR SELECTIVE REMOVAL OF H₂S BY ABSORPTION IN METHANOL

John W. Tierney, Huntley, Ill., assignor to The Pure Oil Company, Chicago, Ill., a corporation of Ohio Application December 21, 1953, Serial No. 399,535

5 Claims. (Cl. 260—609)

This invention relates to the removal of hydrogen sulfide from industrial gases. It is more specifically directed to a continuous, regenerative process for selectively removing hydrogen sulfide from admixture with other gaseous components, such as $CO_2$, normally gaseous hydrocarbons, and other materials generally found in industrial gases.

The removal of hydrogen sulfide from industrial gases, such as natural gas and manufactured gases, is not new and a number of processes have been developed for this purpose. Most of the commercial processes employed in this service utilize an absorbing solution, which upon contacting the hydrogen sulfide-containing gas effects the removal of the hydrogen sulfide. Although one of the more facile techniques employs a caustic alkali solution as the absorbent, this method is non-regenerative and also removes any $CO_2$ if this constituent is contained in the gaseous admixture along with hydrogen sulfide. While there are selective processes for removing hydrogen sulfide which employ a potassium permanganate or a buffered solution of sodium dichromate and zinc sulfate, these processes also are non-regenerative.

Due to the excess cost of operation resulting from the replacement of absorbents used in non-regenerative processes, and the waste disposal problem occasioned by the production of spent absorbents, it is preferred that an absorbent, which may be regenerated after use, be employed in processes where significant quantities of hydrogen sulfide are to be removed. A number of such processes are available for commercial use in this service. These include the Seaboard process developed by the Koppers Company which employs a sodium carbonate solution, the Girbitol process in which is used an aqueous solution of ethanolamine. Other processes which use the same general flow scheme are the Shell phosphate process which utilizes a solution of tripotassium phosphate, and the phenolate process wherein a sodium phenolate solution functions as the absorbent.

It has been found that the removal of hydrogen sulfide from admixture with other gaseous components can also be carried out in an economical and efficient manner using the novel absorbent of this invention. Accordingly, it is an object of this invention to selectively remove hydrogen sulfide from a mixture of hydrogen sulfide, $CO_2$, normally gaseous hydrocarbons and other materials occurring in natural gas, off gases from petroleum refining processes, manufactured gases, and the like by contacting the gas with a selective absorbent. It is a further objective of this invention to prepare hydrogen sulfide-containing methanol charging stock for use in a catalytic process for the manufacture of methanethiol by reacting methanol and hydrogen sulfide. These and other objects will become apparent from the following detailed description of this invention.

Figure 1:
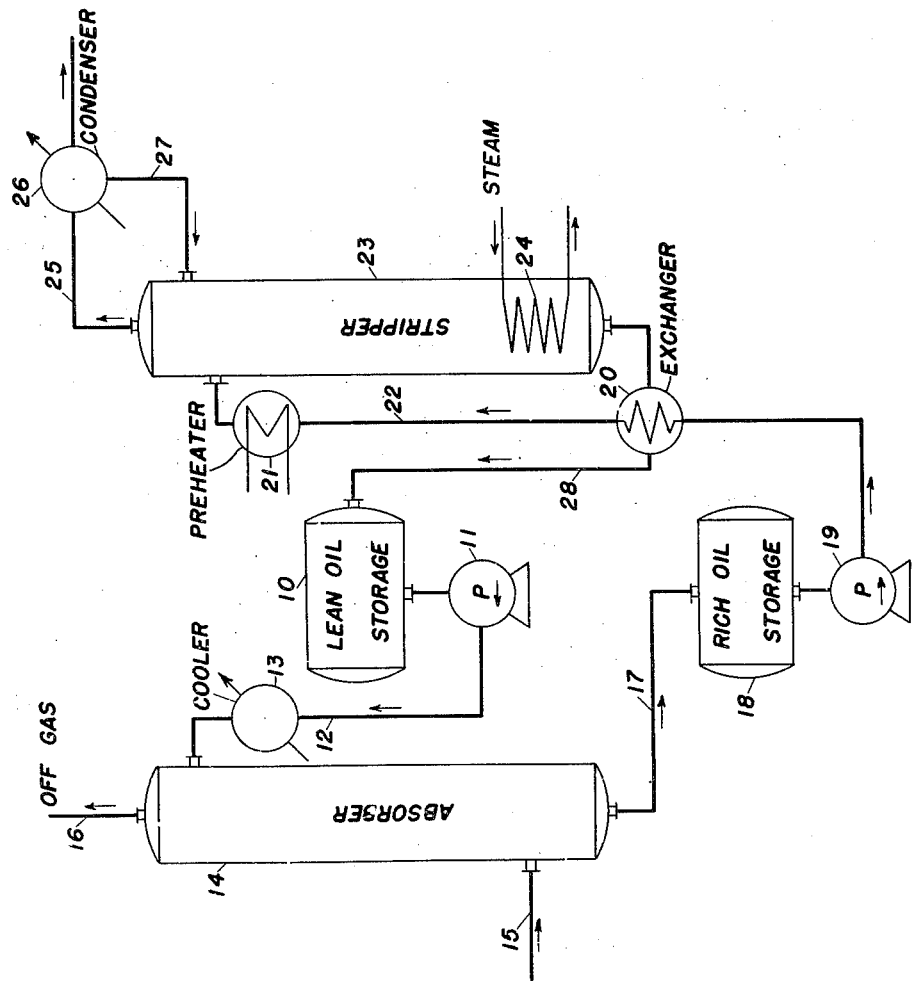
Figure 1 is a flow diagram illustrating the use of methanol in a selective absorption system for the removal of hydrogen sulfide from admixture with other gaseous materials, such as $CO_2$ light hydrocarbons, etc.

It is often desirable to selectively remove hydrogen sulfide from mixtures of hydrogen sulfide, $CO_2$, normally gaseous light hydrocarbons, and other materials normally occurring in petroleum refinery gas streams, natural gas, manufactured gases, and the like. One of the most advantageous methods employed to preferentially separate a component from a gaseous mixture is to contact the gas with a liquid in which the desired gas is more soluble than the other gaseous components forming the gaseous mixture. It has been found that this technique can be effectively employed in a process for the selective removal and recovery of hydrogen sulfide by employing methanol as the selective absorbent. As in the process discussed above, the process in which the instant invention is employed uses some type of contactor, such as a tray, spray, or packed tower in which the gas to be treated passes upwardly countercurrent to the liquid flow. In Figure 1 is shown a typical absorption system in which methanol is employed as the absorption liquid. In this process, lean methanol from lean oil storage 10 is pumped by means of pump 11 through line 12. Cooler 13 is disposed within 12 to control the temperature of the absorbent entering into absorber 14. Absorber 14 may be any conventional type of column, such as a packed, tray, or spray tower. It is preferred, however, to employ a column packed with ceramics or carbon rings, saddles, spirals, or the like because of the corrosive nature of the gaseous mixture being treated. The gas feed containing hydrogen sulfide enters the absorber through line 15 where it rises countercurrent to the methanol flow. The residual gas, which is not absorbed by the methanol, is withdrawn from the absorber by means of line 16. The rich methanol containing dissolved gases removed from the gaseous feed flows through line 17 to rich oil storage 18, and is then pumped by means of pump 19 through heat exchanger 20 and preheater 21 by means of line 22 and introduced into stripper 23. In this unit the rich methanol flows down the tower countercurrent to rising methanol vapors. Heat is introduced in the bottom of the tower through coil 24 to vaporize the methanol which is then employed as the stripping medium. The solubility of the dissolved gases is much decreased in the warm methanol and they are desorbed and withdrawn from the top of the tower through line 25. A condenser 26 is placed in this line to condense any methanol which is carried out of the system in desorbed gases. This methanol is returned to the stripper tower 23 through line 27. The stripped methanol is then returned to lean oil storage 10 through heat exchanger 20 by means of line 28 for re-use in the absorbing section of the system.

Figure 2:
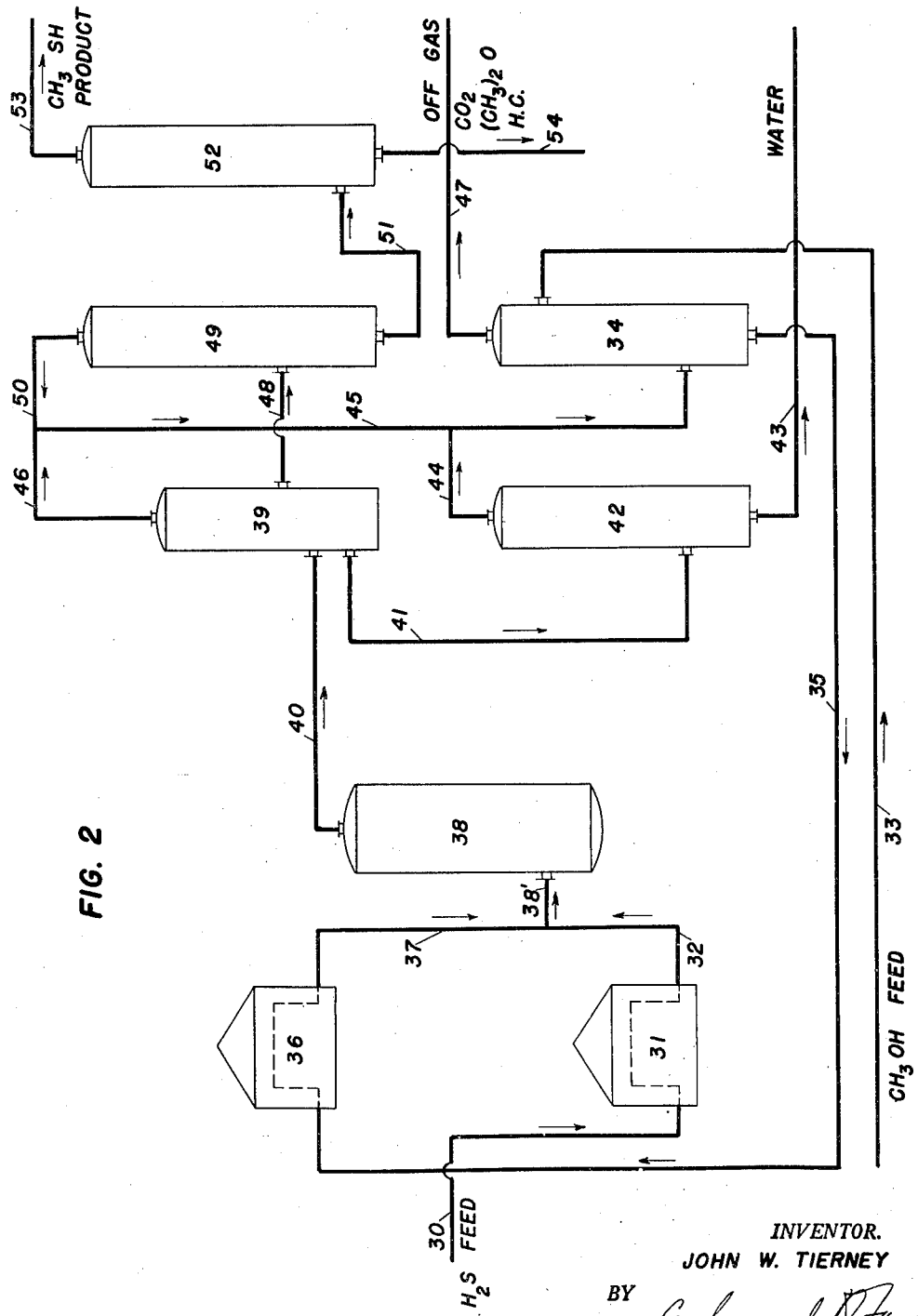
Figure 2 is a schematic diagram of a process for preparing methanethiol by reacting hydrogen sulfide and methanol in the presence of a suitable catalyst wherein the methanol charging stock is pretreated in accordance with this invention.

The use of methanol as an absorption liquid to selectively remove hydrogen sulfide from a gaseous stream can be particularly advantageous when a mixture of methanol and hydrogen sulfide is desired for processing without further separation. For example, one method of manufacturing methanethiol employs the catalyzed reaction between methanol and hydrogen sulfide. In the interest of economy, it is desirable to remove unreacted hydrogen sulfide from the reaction effluent produced in this process and recycle it to the reactor for recycling the entire gaseous fraction from the process would allow contaminates, such as $CO_2$ and light hydrocarbons, to accumulate in the system. It is therefore desirable to pretreat the gaseous fraction of the reaction effluent prior to recycling it to the reactor section by employing a selective absorption system using methanol as the absorbent, and returning the hydrogen sulfide enriched methanol produced in this section directly to the reactor. A more specific embodiment of this phase of the invention is shown in Figure 2 where it is seen that fresh hydrogen sulfide feed is introduced into the system through line 30 and passes through heater 31 where it is heated to reaction temperature. The pretreated hydrogen sulfide leaves heater 31 by means of line 32. Methanol is charged to the system by means of line 33. It is initially sent to absorber 34, the purpose of which is hereinafter discussed. The methanol feed is discharged from absorber 34 through line 35. It is then heated to reaction temperature in furnace 36 being discharged through line 37 to a point of confluence with line 32, which contains pretreated hydrogen sulfide. The resultant reaction mixture is then introduced into reactor 38 by means of line 38'. The reactor may be of the fixed or moving bed, or fluidized type. The catalyst used herein is one suitable for promoting the reaction between hydrogen sulfide and methanol. Suitable catalysts and manipulative techniques employed in carrying out this reaction are described in U. S. patent applications, Serial Nos. 342,710, filed March 16, 1953, now Patent No. 2,685,605; 370,235, filed July 24, 1953; 370,642, filed July 27, 1953; 381,984, filed September 23, 1953; 377,668, filed August 31, 1953; 389,858, filed November 2, 1953; and U. S. Patent 2,647,151. The effluent from reactor 38 is introduced into separator 39 by means of line 40, where upon separating, three phases are formed, a gas phase, a methanethiol phase, and a water phase, all in equilibrium with each other. The water phase containing some hydrogen sulfide and methanethiol and most of the unreacted methanol in solution goes through line 41 to a fractionator 42 where the water is taken off as a bottom product through line 43 and disposed of. The gaseous overhead from fractionator 42 consisting essentially of hydrogen sulfide, methanethiol and minor amounts of 2-thiapropane and methanol as well as gaseous contaminants such as $CO_2$, or normally gaseous hydrocarbons which may have been introduced into the reaction system in admixture with the hydrogen sulfide feed stock, passes through line 44 to line 45 where it admixes with the gaseous phase of the reaction effluent, which is discharged from separator 39 through line 46 which has a composition similar to the gaseous overhead withdrawn from the fractionator 42. The resultant admixture is charged into absorber 34. In absorber 34, the gaseous feed is contacted with fresh feed methanol introduced into the absorber via line 33. The methanol preferentially absorbs methanethiol, 2-thiapropane, methanol and hydrogen sulfide from the gaseous mixture. The enriched methanol thus prepared is then advantageously employed in the preparation of the reaction mixture hereinbefore described. The off gas from absorber 34, which contains $CO_2$ and light hydrocarbons which may have been present in the hydrogen sulfide fresh feed as well as small amounts of dimethyl ether produced during the reaction in reactor 38 is discharged from the system through line 47 thus precluding their accumulation in the flow system.

The methanethiol phase containing most of the 2-thiapropane and some dimethyl ether, hydrogen sulfide, unreacted methanol, and a trace of water is discharged from separator 39 through line 48 and introduced into stabilizer 49 where all of the material with a boiling point lower than methanethiol is separated and removed from the stabilizer through line 50 which, like line 46, joins with line 45. The bottom product from stabilizer 49, consisting essentially of methanethiol, 2-thiapropane, methanol, and some water is sent through line 51 into fractionator 52. The methanethiol produced is recovered as overhead through line 53 and is sent to suitable storage facilities. The bottoms from fractionator 52, consisting essentially of 2-thiapropane, some methanol, and a trace of water is discharged from the system through line 54. This stream may be either processed to recover 2-thiapropane or recycled to the reaction section of the system where it may be contacted with additional amounts of hydrogen sulfide in the presence of a suitable catalyst to produce additional amounts of methanethiol. This technique is described in co-pending applications.

The subject invention may also be employed in connection with the preparation of methanethiol by means of the above described process as a feed purification process for pretreating the hydrogen sulfide feed stock prior to its introduction into the reactor. Occasionally the hydrogen sulfide used in the preparation of methanethiol is derived from a source which contains substantial amounts of other gaseous components. Therefore, if it is desirable, these components may be removed from the hydrogen sulfide prior to its being used in the process as a reactant. The hydrogen sulfide used as feed stock in preparation of higher molecular thiols in a reaction involving higher molecular weight alcohols may also be purified in accordance with this invention. It will be necessary however in this instance to recover the hydrogen sulfide from the methanol absorbent prior to the use of the hydrogen sulfide in the reaction.

In determining the operating conditions which are to be employed in carrying out the instant invention, the limiting factor is the vapor pressure of the methanol adsorbent; otherwise, conventional procedure can be used. This factor must be borne in mind in making the design calculations where such conditions as pressure, temperature, and liquid-gas ratio are selected in order to avoid unsatisfactory operation due to excessive evaporation of methanol in the absorption or stripping stages. It is, therefore, preferred that an absorption system employing the instant invention be operated at room temperature and a pressure of about 150#/sq. inch; however, satisfactory operation can be obtained using other temperatures and pressures.

The subject invention may also find application in systems other than those described above, for example, the selective nature of the absorbent of this invention makes it useful in the purification of $CO_2$ gases containing hydrogen sulfide prior to liquefaction and Dry Ice processes.

I, therefore, claim as my invention:

1. In a process for preparing methanethiol which comprises contacting methanol and an admixture containing $CO_2$, normally gaseous hydrocarbons and a substantial portion of hydrogen sulfide in a reaction zone in the presence of a catalyst and under suitable conditions of temperature and pressure to produce a gaseous fraction consisting essentially of hydrogen sulfide, and small amounts of methanethiol, 2-thiapropane, methanol, water, and $CO_2$ and normally gaseous hydrocarbon contaminants introduced into the reaction zone in admixture with the hydrogen sulfide, a methanethiol fraction, and a water fraction, the improvement which comprises, contacting said gaseous fraction with sufficient amounts of an absorbent consisting of liquid methanol to selectively remove the hydrogen sulfide contained in said gaseous fraction and produce a hydrogen sulfide-enriched methanol, introducing said enriched methanol into said reaction zone said contacting being carried out under operating conditions of temperature and pressure whereby the methanol is maintained in the liquid phase during said contacting.

2. A process in accordance with claim 1 in which at least a portion of the methanol charged to the reaction zone is employed in said contacting step.

3. In a process for preparing methanethiol by reacting hydrogen sulfide and methanol in a reaction zone in the presence of a catalyst, under suitable reaction conditions of temperature and pressure conducive to the preparation of methanethiol to produce a reaction effluent containing hydrogen sulfide and methanethiol, said effluent being fractionated to produce a gaseous fraction containing hydrogen sulfide, the improvement which comprises contacting said gaseous fraction with at least a portion of said methanol reactant in an amount sufficient to selectively remove substantially all of said hydrogen sulfide from said gaseous fraction, and passing the resulting H₂S enriched methanol to said reaction zone said contacting being carried out under operating conditions of temperature and pressure whereby the methanol is maintained in the liquid phase during said contacting.

4. In a process in accordance with claim 3 in which said contacting is carried out at a temperature of about 60°–100° F. and a pressure of about 125–175 p. s. i.

5. In a process for preparing methanethiol by reacting methanol and hydrogen sulfide in a reaction zone in the presence of a catalyst and under suitable reaction conditions to produce methanethiol, the steps which comprise contacting a gaseous admixture consisting of a substantial portion of hydrogen sulfide in combination with $CO_2$ and normally gaseous hydrocarbons with sufficient amounts of an absorbent consisting of liquid methanol to selectively remove the hydrogen sulfide from said admixture to produce a hydrogen sulfide-enriched methanol and introducing said enriched methanol into said reaction zone in the absence of the remaining constituents of said admixture.

References Cited in the file of this patent

UNITED STATES PATENTS

| | | |
|---|---|---|
| 1,395,389 | Claude | Nov. 1, 1921 |
| 2,146,353 | Rosebaugh | Feb. 7, 1939 |
| 2,242,323 | Powell | May 20, 1941 |
| 2,390,099 | Harmon | Dec. 4, 1945 |
| 2,472,470 | Eby | June 7, 1949 |
| 2,486,778 | Doumani | Nov. 1, 1949 |
| 2,503,528 | Walker | Apr. 11, 1950 |
| 2,514,300 | Laughlin | July 4, 1950 |
| 2,565,195 | Bell | Aug. 21, 1951 |
| 2,592,646 | Bell | Apr. 15, 1952 |
| 2,667,515 | Beach | Jan. 26, 1954 |
| 2,685,605 | Bell | Aug. 3, 1954 |

OTHER REFERENCES

Mellor: "Comprehensive Treatise on Inorganic and Theoretical Chemistry," vol. 10, page 138.

Davidson: "Gas Manufacture," Longmans, Green and Co., N. Y., 1923, pages 87 and 260.